United States Patent Office 3,515,751
Patented June 2, 1970

3,515,751
PROCESS FOR OXIDATION OF CYCLOHEXANE
Arthur E. Oberster, North Canton, and George E. P. Smith, Jr., Akron, Ohio, and Kelly Farhat, Leominster, Mass., assignors to The Firestone Tire & Rubber Company, Akron, Ohio, a corporation of Ohio
No Drawing. Filed Sept. 25, 1967, Ser. No. 670,422
Int. Cl. C07c 51/20
U.S. Cl. 260—533                                          4 Claims

ABSTRACT OF THE DISCLOSURE

This disclosure relates to a process for the production of epsilon-hydroxycaproic acid in which cyclohexane is oxidized by liquid phase air oxidation in the presence of a catalytic amount of a lower aliphatic carboxylic acid and a catalytic amount of a peroxide under certain reaction conditions so that most of the oxidation products are found in a second, heavy liquid layer, and are directed to the production of epsilon-hydroxycaproic acid.

---

This invention relates to a new process for oxidizing cyclohexane to form epsilon-hydroxycaproic acid; hereafter designated as "E–HCA," for convenience. The process of this invention comprises passing an oxygen-containing gas, such as air, through a reaction mixture of cyclohexane under certain conditions of temperature and pressure and in the presence of a catalytic amount of a peroxide and a catalytic amount of a lower aliphatic carboxylic acid.

The usual liquid phase air oxidation of a cycloaliphatic hydrocarbon is a well-known process. The manufacture of cyclohexanol and cyclohexanone by the liquid phase air oxidation of cyclohexane is well-known. Processes of this type are known with or without the presence of a metallic catalyst, such as cobalt naphthenate, although the presence of a metallic catalyst is the preferred commercial method. Small amounts of E–HCA and adipic acid may, under certain conditions, be formed as a by-product in these liquid phase air oxidation processes of cyclohexane to cyclohexanol and cyclohexanone, but these amounts do not separate as a distinct phase, and are usually in such minute quantities as it be ignored in the previous art and commercial processes for the air oxidation of cyclohexane to cyclohexanol and cyclohexanone.

In the process of this invention, in distinction from previous processes, an immiscible heavy liquid layer containing a large amount of E–HCA and material readily converted to E–HCA, such as ester, dimers, trimers and other oligomers of E–HCA, is formed in the reaction vessel. The heavy layer separates by gravity, the esters and oligomers are converted to E–HCA, and the E–HCA is isolated by methods described below. The lighter layer comprising unreacted cyclohexane, cyclohexanol and cyclohexanone may be recycled to be re-used as part of the starting reactants in a continuous oxidation process in such fashion that essentially no cyclohexanol and cyclohexanone are final products of this process.

The usual process for the liquid phase air oxidation of cyclohexane to primary products was first disclosed in U.S. Pat. 2,223,494 to Loder and the preferred method of operation is disclosed in U.S. Pat. 2,870,203 to Cyphers. These references show that the process is always carried out in the presence of small quantities of organometallic catalysts, such as cobalt naphthenate, that at the optimum conditions and conversions of 10–12% of the cyclohexane; 85–90 percent of the total oxidation products consists of cyclohexanol and cyclohexanone, and the other 10–15 percent consists of adipic acid plus smaller quantities of various other products, not including E–HCA. Conditions can be varied to increase the yields of adipic acid and other dibasic acids containing fewer carbon atoms, but no reference teaches the production of E–HCA by this process.

Two British patents disclose processes for the oxidation of cyclohexane with the resulting products containing E–HCA. British Pat. 774,687 to Farbenfabriken Bayer, A. G. discloses a method for separating E–HCA from the residue obtained in an air oxidation of cyclohexane in which this oxidation is referred to as being "known per se."

After removal of volatile components of the reaction mixture by "short distillation," that is unreacted cyclohexane, cyclohexanol and cyclohexanone, the distillation residue was esterified with methanol followed by the separation of the methyl esters of E–HCA and adipic acid. The oxidation process was operated continuously. In Examples 1 (p. 2) and 4 (p. 3) the percentage yields of the esters given are percentages of ester obtained based on the esterification reaction mixture, and therefore must be calculated back to E–HCA based on the original oxidation residue; such calculations are as follows:

| | Example 1 | Example 4 |
|---|---|---|
| Wt. of distillation residue (g.) | 5,000 | 1,000 |
| E–HCA methyl ester (g.) | 1,473 | 279 |
| E–HCA (g.) | 1,333 | 252 |
| Percent E–HCA in original oxidation residue | 26.7 | 25.2 |
| Adipic acid dimethyl ester (g.) | 1,907 | 353 |
| Adipic acid (g.) | 1,600 | 296 |
| Percent adipic acid in original oxidation residue | 32.0 | 29.6 |

The air oxidation referred to in the examples as "known per se," obviously must be interpreted in terms of the known art. The "usual" process as described above produces an oxidation product containing about 90% cyclohexanol/cyclohexanone mixture plus about 10% adipic acid and no hydroxycaproic acid is described as a product of this process. Furthermore, we have carried out this process a great many times under varied conditions and have never found more than the slightest traces of E–HCA. Hence, it is concluded that the oxidation residue of British Pat. 774,687 must *not* have been obtained by the "usual" oxidation process, or by extending the usual process to higher temperatures and longer times which merely produces less cyclohexanol/cyclohexanone mixture and more adipic acid, but was produced by the process of German Pat. 964,237 to Farbenfabriken Bayer, A.G. In this patent, cyclohexane is air oxidized in liquid phase in the presence of 0.1% cobalt naphthenate to produce, by distillation, 5,000 g. of cyclohexanol/cyclohexanone plus 4,500 g. of "by product acids," i.e., the distillation residue of British Pat. 774,687. On this basis, the oxidation products of the Bayer process are as follows:

Cyclohexanol and cyclohexanone—5,555 g.
Distillation residue—5,000 g.
Total oxidation products—10,555 g.
E–HCA, up to 30% distillation residue—1,500 g.
E–HCA, percent of total oxidation product—14.2%
Adipic acid, about 30% distillation residue—1,500 g.
Adipic acid, percent of total oxidation products—14.2%

British Pat. 935,029 to Celanese Corporation discloses a process for the oxidation of cyclohexane to cyclohexanol, cyclohexanone and E–HCA in the presence of a metallic catalyst, preferably cobalt naphthenate. At page 3, lines 1 through 5, the optimum results for this process under continuous reaction conditions are shown to produce reaction mixtures containing 35 to 62 parts of total oxidation products. Of the total oxidation products, 4 to 8 parts or 11–13% is E–HCA plus 3–6.5% adipic acid, which are separated from the other ingredients in the reaction mixture by aqueous extraction.

These disclosures producing oxidation products containing no more than 15% E–HCA represent the upper limit to which the liquid phase oxidation of cyclohexane can be pushed toward the production of E–HCA by known processes.

Also of interest is U.S. Pat. 2,684,984, which discloses a process for the production of cyclic alcohols and ketones. This process comprises the liquid phase air oxidation of cyclohexane to cyclohexanol and cyclohexanone, in the presence of acetic acid at 145° C., 120 p.s.i.g., and an air flow rate of 0.5 liter per minute per kilogram charged. Example I discloses a time of 200 minutes and Example II discloses a time of 100 minutes. The reaction of 2,684,984 is directed to the production of oxidation products containing 85–90% or more of cyclohexanol and cyclohexanone and does not disclose the production of any acids. A residue is not mentioned, nor is the formation of any higher oxidation products. There is no disclosure of any externally added peroxide and the oxidative conditions are mild as compared to the conditions under which the reaction of this invention takes place.

At no place in the art is there described the formation of a second heavy liquid layer in the oxidation mixture containing a large concentration and yield of E–HCA from the liquid phase oxidation of cyclohexane.

The process of the present invention results in a recoverable and unexpectedly large percent of E–HCA from the liquid phase oxidation of cyclohexane under easily obtainable conditions of temperature and pressure. This is accomplished in the absence of the usual metal catalysts required to produce maximum yields of cyclohexanol, cyclohexanone, and adipic acid, and in the presence of a catalytic amount of a hydrocarbon peroxide and a catalytic amount of a lower aliphatic carboxylic acid.

By the process of this invention cyclohexane is placed in a closed reactor with about 0.02 to about 0.1 mole of a lower aliphatic carboxylic acid per mole of cyclohexane and about 0.05 to 0.25 gram of peroxide per liter of cyclohexane. This oxidation mixture is then subjected to conditions of elevated temperature and elevated pressure and an oxygen-containing gas, such as air, is bubbled into the material charged to the reactor at a rate which is equivalent to from about 1.0 to 2 liters of air per minute, per 1000 grams of material charged. The temperature of oxidation is generally in the range of from about 125° C. to about 145° C. and the pressure is within the range of from about 50 p.s.i.g. to about 250 p.s.i.g. The time of exposure of the reaction mixture to the gas at the above conditions ranges from about 2 to about 5 hours in the batch process and preferably is no longer than six hours in any case.

The oxidation conditions should be maintained within these certain limits with the air flow rate and temperature being most critical. It is essential that these two variables be changed in inverse relation to assure that the oxidative conditions are not too severe (both higher temperature and air flow rate combined) resulting in the production of chain scission oxidation products or too mild (both lower temperature and air flow rate combined) resulting in the production only of ketones and alcohols. To retain the proper oxidation conditions, the air flow rate can be increased when the temperature is decreased, slightly, and vice versa. These relationships will be explained further in relation to the examples.

During the oxidation reaction of this invention, a separation occurs with two distinct layers resulting. This separation is not found in the conventional process, such as in Example I, where the lower aliphatic carboxylic acid was not added to the reaction mixture. In the process of this invention, the lighter layer of the reaction mixture contains unreacted cyclohexane, cyclohexanol and cyclohexanone all of which may be recycled to be re-used as part of the starting reactants in a continuous oxidation process. The heavy layer contains a mixture comprised of a major portion of E–HCA, esters of E–HCA, and dimers and trimers and oligomers of E–HCA, a minor portion of adipic acid and very small portions of other dibasic acids containing fewer carbon atoms, such as glutaric acid and succinic acid. Various methods of converting the E–HCA esters, dimers and trimers and oligomers of E–HCA to E–HCA are known, as for instance, by alkaline hydrolysis, and may be utilized.

The lower aliphatic carboxylic acid utilized in this invention may contain from one to five carbon atoms. It should be a mono-carboxylic acid. Acetic acid has been found to be particularly well-suited for use in this process. The results, as exemplified by the examples, show that this acid when used in combination with an organic peroxide in the absence of an organometallic oxidation catalyst, directs the oxidation reaction in such a way as to give oxidation products containing high percentages of E–HCA directly in the reactor, a result that was unheard of prior to this process. The acid may be added initially, incrementally, or after a period of induction.

As the examples clearly show, the reaction of this invention is only obtained when an organic peroxide or hydroperoxide is present with the lower aliphatic monocarboxylic acid. The peroxide or hydroperoxide may be added externally of the other reactants. It may be preformed by oxidation of cyclohexane to cyclohexyl hydroperoxide or by oxidation of cyclohexanol/cyclohexanone to cyclohexanone peroxide and then added to the reaction mixture. Also the peroxide may be formed in situ under the oxidative conditions which give the reaction of this invention.

The oxygen-containing gas used in carrying out this invention is most conveniently air, but may be pure oxygen or oxygen admixed with another gas such as nitrogen, helium or other inert gas in varying proportions. Whatever the oxygen content of the gas being used, the rate at which it is applied to the reaction mass should be desirably within the range which is equivalent to from 1 to 2 liters of air per minute per 1000 grams of charge.

The process of this invention, as in other similar processes, may be operated as a batch process, with subsequent recovery and recycle of recovered cyclohexane, cyclohexanol, and cyclohexanone, their hydroperoxides and peroxides and lower aliphatic carboxylic acids, all or any combination of these, to the next batch. Alternatively, the process may be operated as a continuous process with continuous recycle of recovered cyclohexane, cyclohexanol, cyclohexanone, their hydroperoxides and peroxides and lower aliphatic carboxylic acids.

The reaction is sensitive to rates of mixing and stirring, possibly due to the fact that reaction is required between diluted oxygen as a gas in the presence of two immiscible liquid layers. Insufficient stirring results in markedly decreased reaction, while too vigorous mixing and too large gas flow rates carries large quantities of reactants out of the reactor. Mixing created by the gas flow through the liquid is insufficient for best results and a propeller type stirrer in the liquid phases rotating at about 1200–1700 r.p.m. was found to be near the optimum.

The reactor for this process can be manufactured from any suitable material for containing the pressure without being attacked by the reaction medium. Stainless steel, glass and glass-lined iron and steel, nickel, nickel-lined and other corrosion resistant materials are suitable for this purpose. In breaking in a new vessel, it usually is necessary to carry out the oxidation reactions for several hours before optimum results are obtained, thereby removing inhibitor surface films, after which no further treatment is necessary for optimum results.

Having thus described in general the catalytic process utilized in accordance with this invention, it becomes convenient at this point to illustrate the manner of using the invention by the following examples, which are to be understood as illustrative only and not as limiting the invention to the precise scope thereof.

In reference to the following examples, the reactions were carried out in either a 1 liter or a 1 gallon stainless steel autoclave equipped with a magnetic stirring device. The autoclave was equipped with a gas inlet tube leading from a source of air and a rotameter to regulate the flow of air into the reaction and a gas outlet tube equipped with a pressure relief valve so as to maintain a constant pressure in the reactor. The air source in these experiments consisted of a cylinder of compressed air.

The reaction product was separated into two distinct phases, the light and heavy layers. The light layer was separated and analyzed for cyclohexane, cyclohexanol and cyclohexanone using vapor phase chromatography employing a 10 ft., 4 mm. I.D. column packed with 20% Ucom 550X on Chromosorb P. The column was operated at 140° C. with the injector temperature at 260° C. and the detector at 300° C. The helium flow rate was 125 ml. per minute.

The heavy layer obtained in the reactions of the examples was treated in the following manner. The entire heavy layer, after removal of small amounts of cyclohexane, cyclohexanol and cyclohexanone by distillation, was hydrolyzed using aqueous sodium hydroxide. The resulting alkaline solution was acidified and the resulting mixture of acids was extracted using an appropriate solvent such as chloroform or ethyl acetate. The organic layer containing E–HCA, adipic and small amounts of other acids, was then distilled under reduced pressure to remove solvent and the resulting mixture of acids was analyzed òr separated by the methods described in the following:

(A) Vapor phase chromatographic analysis of the acid mixture

The mixture of acids was treated with trimethylchlorosilane in pyridine which converts the acid groups to trimethylsilyl esters and the hydroxyl groups to trimethylsilylethers. These derivatives were then analyzed by vapor phase chromatography using a 6 ft., 4 mm. I.D. column packed with 7% SE–30 on Chrososorb W. The chromatograph was operated with a helium flow rate of 100 ml./min., injector temperature at 260° C., column temperature at 140° C. and the detector temperature at 300° C. An internal stardard, dodecyl alcohol, was used in order to obtain a quantitative measurement of the mixture.

(B) Partition chromatography

The method for separation of organic acids as described by C. S. Marvel, et al., J. Am. Chem. Soc., 72, 2642 (1950) utilizes partition chromatography. The column consisted of silicic acid impregnated with water or 0.3 N sulfuric acid. Chloroform and chloroform-butanol mixtures of varying compositions were used as the developing solvents. This method allows the separation of the free acids directly rather than the trimethyl silyl derivatives described in A above.

(C) Ion-exchange chromatography

The acid mixture was separated by using ion-exchange chromatography as described by H. S. Owens, et al., Anal., Chem., 25, 1507 (1953), specifically using Resin A as supplied by Permutit Corporation.

PREPARATION OF PREFERRED PEROXIDE INITIATOR

The 1 liter reactor was charged with 498 ml. of cyclohexane and 1.25 ml. of cyclohexanone. This reaction mixture was then reacted with air for a period of 2.5 hours at a temperature of 145° C., and a pressure of 140 p.s.i.g. with an air flow rate of 0.886 liter per minute per kilogram of charge. The stirrer was operated at 1200 r.p.m.

At the end of this reaction period, the reaction mixture was cooled and removed from the reactor. The mixture was titrated for organic peroxides by the method outlined in "Quantitative Analysis" by Pierce and Haenisch published New York, 1950, page 242, 244–245 and was shown to contain about 0.6% organic peroxide, calculated as cyclohexyl hydroperoxide. This solution will be used in subsequent reactions as a peroxide initiator and will be referred to as Solution "A."

Example I

This example represents a control without addition of lower aliphatic organic acid in conjunction with the organic peroxide or hydroperoxide under the same conditions of temperature and pressure. The 1 liter reactor was charged with 490 ml. of cyclohexane and 10 ml. of the peroxide initiator, Solution "A," equivalent to 0.048 g. of peroxide charged (calculated as cyclohexyl hydroperoxide). The reaction mixture was then reacted with air for a period of 6 hours at a temperature of 130° C. and a pressure of 100 p.s.i.g. with an air flow rate of 1.75 liters per minute per kilogram of charge. The stirrer was operated at a speed of 1200 r.p.m. At the end of this time, the reaction mixture was cooled and removed from the reactor. The reaction mixture was analyzed by vapor phase chromatography and was shown to contain 93.1% cyclohexane, 4.4% cyclohexanol, 2.5% cyclohexanone. The organic peroxide content as determined by titration was about 0.54% calculated as cyclohexyl hydroperoxide. In this reaction, no trace of E-hydroxycaproic acid was obtained or could be found.

Example II

The batch process is illustrated by this example. The 1 liter reactor was charged with 490 ml. of cyclohexane and 10 ml. of the initiator Solution "A" and reacted with air at 130° C. and 100 p.s.i.g. with an air flow rate of 1.7 liters per minute per kiogram of charge and a stirrer speed of 1200 r.p.m. The reaction was continued for 5½ hours, then cooled and 13.2 ml. of glacial acetic acid was added and the reaction continued an additional 2 hours. The reaction mixture was cooled and removed from the reactor.

The reaction mixture separated into 2 layers and the layers were separated in a separatory funnel. The light layer containing cyclohexanol, cyclohexanone and unreacted cyclohexane was analyzed by vapor phase chromatography. The heavy layer containing the adipic acid, hydroxycaproic acid, esters, oligomers, etc. was hydrolyzed with aqueous alkali. The hydrolysate was neutralized and extracted with chloroform and ether. The organic extracts were combined, dried and evaporated under reduced pressure at 0° C. The resulting product was then separated on a partition chromatographic column using silicic acid impregnated with 0.3 N sulfuric acid as the stationary phase and chloroform/butanol mixtures as the mobile phase. The fractions eluted from the column were titrated with 0.01 N NaOH solution. The product distribution was as follows:

Cyclohexane charged—389 g.
Cyclohexane recovered—353 g.
Cyclohexane converted—36 g. (9.2%)
Cyclohexanone recovered—13.5 g.
Cyclohexanol recovered—11.5 g.
Weight of acid layer—32.0 g.
Total oxidation products (sum of cyclohexanone, cyclohexanol and acid layer recovered)—57.0 g.
E–HCA, by partition chromatographic analysis—20.5 g.
Adipic acid, by partition chromatographic analysis—7.8 g.
E–HCA as percent of acid layer—64.1%
E–HCA as percent of total oxidation products—36.0%
Adipic acid as percent of acid layer—24.4%
Adipic acid as percent of total oxidation products—13.7%

Example III

This is an example of a continuous process type reaction. The 1 gallon reactor was charged with 1870 g. of recycle cyclohexane (recovered from a previous reaction) which contained 7.2 g. lower aliphatic acids; 19.6 g. of fresh glacial acetic acid giving a total of 26.8 g. of lower aliphatic acid; and 130 g. of a recycle solution (recovered from a previous reaction) which contained 44 g. of cyclohexanol, 48 g. of cyclohexanone and 1.49 g. of peroxide calculated as cyclohexyl hydroperoxide. The reaction mixture was then reacted with air at 130° C. and 120 p.s.i.g. for four hours with an air flow rate of 1.6 liters per minute per kilogram of charge. The stirrer was operated at 1200 r.p.m. The reaction mixture was cooled and removed from the reactor. The product consisted of two distinct layers. The entire reaction mixture was placed in a rotary evaporator and the cyclohexane removed by distillation under reduced pressure. A total of 1658.3 g. of cyclohexane was recovered (containing 3.8 g. lower aliphatic acid) which shows that 11.2% of the cyclohexane was converted. The residue remaining was then distilled under reduced pressure and a colorless liquid, B.P. 45–90° C. at 20 mm., was obtained. This distillate was shown by vapor phase chromatography to contain 62 g. of cyclohexanol and 59 g. of cyclohexanone which represents the 44 g. of cyclohexanol charged plus 18 g. of cyclohexanol produced as well as the 48 g. of the cyclohexanone charged plus 11 g. of cyclohexanone produced.

The residue from the distillation above, containing esters, dimers, trimers, and oligomers of E-hydroxycaproic acid and adipic acid, etc., was hydrolyzed using 25% sodium hydroxide solution. The alkaline solution was acidified and extracted with ethyl acetate. The ethyl acetate was then removed by distillation under vacuum and the resulting mixture of acids was analyzed by vapor phase chromatography of the trimethylsilyl derivatives and was shown to contain 50 g. of hydroxycaproic acid and 15.9 g. of adipic acid.

The product distribution for this reaction is as follows:

Cyclohexane charged—1862.8 g.
Cyclohexane recovered—1654.5 g.
Cyclohexane converted—208.3 g. (11.2%)
Cyclohexanone recovered (Representing 48 g. charged and 11 g. obtained from oxidation)—59 g.
Cyclohexanol recovered (Representing 44 g. charged and 18 g. obtained from oxidation)—62 g.
Weight of acid layer—152.7 g.
Total oxidation products (Sum of acid layer, and cyclohexanone and cyclohexanol recovered minus the amounts of cyclohexanone and cyclohexanol charged)—181.7 g.
E–HCA, by vapor phase chromatographic analysis of the trimethylsilyl derivatives—50 g.
Adipic acid, by vapor phase chromatographic analysis of the trimethylsilyl derivatives—15.9 g.
E–HCA as percent of acid layer—32.9%
E–HCA as percent of total oxidation products—27.5%
Adipic acid as percent of acid layer—10.5%
Adipic acid as percent of total oxidation products—8.75%

Example IV

This example represents a control oxidation following the directions of U.S. Pat. 2,684,984. The one gallon reactor was charged with 2100 g. of cyclohexane and 30 g. of acetic acid. The reaction mixture was then reacted with air at 145° C. and 120 p.s.i.g. for five hours with an air flow rate of 0.5 liter per minute per kilogram of charge. The stirrer was operated at 1200 r.p.m. The reaction mixture was cooled and removed from the reactor and worked up in the same manner as shown in Example III. The product distribution was as follows:

Cyclohexane charged—2100 g.
Cyclohexane recovered—1931 g.
Cyclohexane converted 169 g. (8.0%)
Cyclohexanol recovered—56.1 g.
Cyclohexane recovered—52.7 g.
Weight of acid layer separated—None
E–HCA, by vapor phase chromatographic analysis of the trimethylsilyl derivatives—None
Adipic acid, by vapor phase chromatographic analysis of the trimethylsilyl derivatives—6.0 g.

The foregoing examples clearly show that the process of this invention is a new and unique process and was not obvious in the light of the prior art. Examples II and III are in accordance with the process of the invention and disclose variation of the process of the invention. Examples I and IV are included for the purpose of comparison to the prior art only and show the unobviousness of the process of the invention and that the directed production of the E–HCA is unexpected over the processes of the prior art.

Referring to the comparison examples, Example I illustrates a reaction whereby cyclohexane is oxidized according to the prior art in the presence of a peroxide, showing that the resulting oxidation products consisted of cyclohexanol and cyclohexanone and contained none of the E–HCA. The conditions of this oxidation process are 130° C., 100 p.s.i.g. for 6 hours and an air flow rate of 1.75 liters per minute per kilogram charged. This example illustrates that the reaction of the invention with the directed yield of E–HCA is not obtained by the oxidation of cyclohexane under the physical conditions of the reaction of the invention without the presence of both the lower aliphatic carboxylic acid and the peroxide. Example IV illustrates the process disclosed in 2,684,984 with the time increased to 5 hours, the increased time to correspond to the time of the process of the present invention and to favor the formation of E–HCA. The resulting oxidation products comprise cyclohexanol and cyclohexanone as indicated in 2,684,984, with only a minute trace of E–HCA. This example substantiates the disclosure of U.S. 2,684,984 and shows that the addition of time to the process disclosed in 2,684,984 does not result in the directed yield of E–HCA and, therefore, does not result in the process of this invention.

Example II is an example of the process of this invention showing the batch method in which glacial acetic acid and Solution A, containing organic peroxide, were added to cyclohexane in the liquid phase air oxidation under the conditions of this invention. The high yield of E–HCA indicates the process of this invention wherein the oxidation products are unexpectedly directed towards this specific acid. In this example, the cyclohexane and preferred peroxide are mixed and subjected to liquid phase air oxidation for 5.5 hours; then glacial acetic acid is added to the reaction mixture and the reaction is continued for an additional 2 hours with the resulting oxidation products again being directed towards the specific acid—E–HCA.

Example III is an example of the process of this invention illustrating a continuous type reaction in which recycled cyclohexane and other recycled material, containing cyclohexanol, cyclohexanone and some peroxide are used as starting materials. Again, the oxidation products are directed specifically toward E–HCA.

The physical conditions under which the oxidative reaction is run are determinative of the oxidation products recovered as a result of the reaction. The applicants have found that, while retaining constant pressure, time and amount of cyclohexane charged at 120 p.s.i.g., 5 hours, and 2 kilograms, respectively, and varying the air flow rate and temperature that the oxidation products are drastically changed. The applicants have found that, as the examples show, the best conditions for directing the products to E–HCA are an air flow rate of 1.6 liters per minute per kilogram charged and a temperature of 130° C. The oxidative conditions of U.S. 2,684,984, when there is no externally added peroxide, are not severe enough to direct the oxidation products toward E–HCA and this reaction merely results in the formation of cyclohexanol and cyclohexanone, as set out in 2,684,984 and Example IV of this application.

The applicants have also determined that a reaction with the conditions of pressure, time and amount of charge as set out above, yields only cyclohexanol and cyclohexanone when the temperature is 115° C. and air flow rate is 1.7 liters per minute per kilogram charged and as previously discussed, the oxidative conditions of Example IV, 0.5 liter of air per minute per kilogram charged and 145° C. for 5 hours, are also too mild and result only in yields of cyclohexanol and cyclohexanone. Likewise, it has been determined that an air flow rate of 1.7 liters per minute per kilogram charged with a temperature of 145° C. results in chain scission and acids of a lower chain length than the desired E–HCA.

From this data, the applicants have been able to determine that oxidation conditions that are too severe do not result in the reaction of this invention and likewise, oxidation conditions that are too mild do not result in the reaction of this invention. The applicants have been able to set forth the following limits to define the conditions of their reaction:

The pressure ranging from 100–180 p.s.i.g., preferably 100–140 p.s.i.g.; the time ranging between approximately 2 to 5 hours for a batch process, and preferably no longer than 6 hours thereby resulting in a commercial process; the temperature ranging from 125–145° C.; and the air flow rate ranging between 1–2 liters per minute per kilogram charged to give a practical reaction. It is understood in defining the above conditions the air flow rate is directly tied in with the temperature; that as the air flow rate is varied through its range, the temperature must be inversely varied through its range. That is, as the air flow rate is increased through the range of 1 to 2 liters per minute per kilogram charged, the temperature should be decreased through the range of 145–125° C.

The reaction of this invention may be utilized in a batch type or continuous process. In the continuous process, it is contemplated that the lighter layer containing the unreacted cyclohexane, cyclohexanol and cyclohexanone may be recycled, either as a liquid from the reactor or after distillation, thereby being added to the stream.

This recycled lighter layer also contains the lower aliphatic acid which distills with cyclohexane as the azeotrope and peroxides which distill with the cyclohexanol and cyclohexanone so that only small additional quantities of these agents need be added in the continuous process after the initial addition. Therefore, after the reaction is started under the process of this invention with the lower aliphatic carboxylic acid and peroxide added, a continuous reaction may be obtained by recycling the lighter layer to add to more cyclohexane with the addition of calculated lower amounts of fresh peroxide and lower aliphatic carboxylic acid. However, it is necessary that some additional peroxide and some additional lower aliphatic acid must be added, either batch-wise or continuously (within the optimum limits) to carry out the process of the invention.

It is contemplated that the heavy layer of the process of this invention containing the E–HCA and its esters, dimers, trimers, and oligomers may, prior to or after any separation, be treated with ammonia by known processes to be converted directly to caprolactam.

The E–HCA and its derivatives, esters, and low molecular weight polymers, recovered in the heavy layer of the process of this invention may be converted into caprolactam by treatment with aqueous ammonia at elevated temperatures and pressures, or they may be converted into caprolactone by conventional treatment. The caprolactam may then be utilized in the manufacture of nylon polymers and the caprolactone in the manufacture of polyethers, polyesters, and polyurethanes.

Variations of the process of this invention may be made without departing from the scope of the invention.

We claim:

1. The process for the liquid phase oxidation of cyclohexane to epsilon-hydroxycaproic acid and its hydrolyzable esters and oligomers which comprises contacting said cyclohexane in the absence of an oxidation catalyst with a molecular oxygen-containing gaseous stream, having a gas flow rate of oxygen equivalent to between 1.0 and 2.0 liters of air per minute per kilogram of said cyclohexane charged, said contacting being accomplished at a temperature between 125° C. and 145° C. and at a pressure of from 50–250 p.s.i.g. and for from about 2 to about 5 hours in the presence of a catalytic amount of an organic peroxide or an organic hydroperoxide in the range of about 0.05 to about 0.25 gram of peroxide per liter of said cyclohexane and in the presence of a catalytic amount of a lower aliphatic monocarboxylic acid in the range of about 0.02 to about 0.1 mole of said lower aliphatic carboxylic acid per mole of said cyclohexane, whereby a heavy immiscible liquid phase is formed in the reactor which is comprised of epsilon-hydroxycaproic acid and its hydrolyzable esters and oligomers.

2. The process of claim 1 in which said lower aliphatic carboxylic acid contains one to five carbon atoms per molecule.

3. The process of claim 1 in which said lower aliphatic carboxylic acid is acetic acid.

4. The process of claim 1 in which said organic peroxide or hydroperoxide is formed by the oxidation of a mixture of cyclohexane and cyclohexanone.

References Cited
FOREIGN PATENTS 1,195,288   6/1965   Germany.

LORRAINE A. WEINBERGER, Primary Examiner

D. E. STENZEL, Assistant Examiner

U.S. Cl. X.R.

260—484, 535

PO-1050
(5/69)

UNITED STATES PATENT OFFICE
CERTIFICATE OF CORRECTION

Patent No. 3,515,751      Dated June 2, 1970

Inventor(s) Arthur E. Oberster, George E.P. Smith, Jr., & Kelly Farhat

It is certified that error appears in the above-identified patent and that said Letters Patent are hereby corrected as shown below:

Column 5, line 42 "Chrosorb" should read --Chromosorb--

Column 6, line 40 "kiogram" should read --kilogram--

Column 8, Example IV, line 5 "Cyclohexane" should read --Cyclohexanone--

SIGNED AND
SEALED

SEP 29 1970

(SEAL)
Attest:

Edward M. Fletcher, Jr.
Attesting Officer

WILLIAM E. SCHUYLER, JR.
Commissioner of Patents